(No Model.) 2 Sheets—Sheet 1.
H. N. B. GOOD.
PHOTOGRAPHIC CAMERA.
No. 421,923. Patented Feb. 25, 1890.
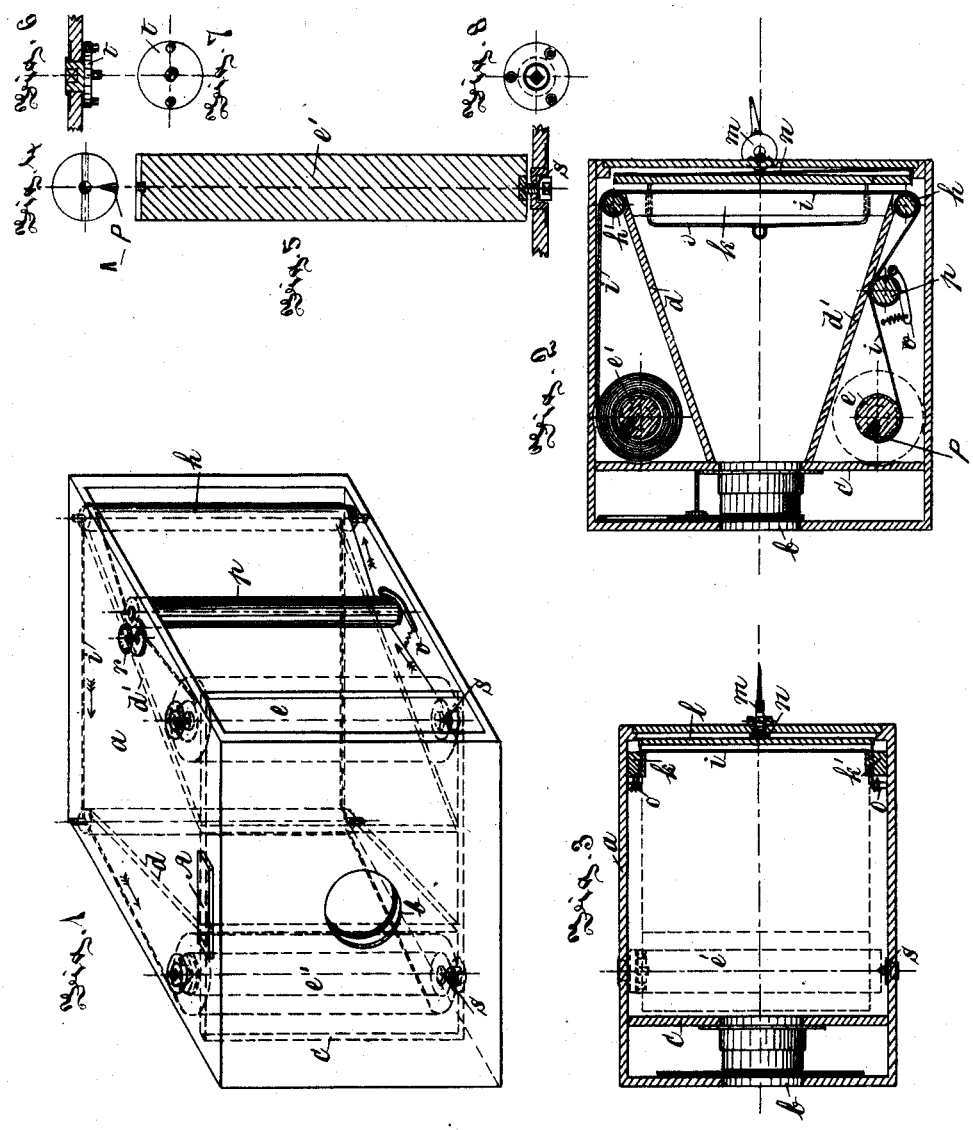
Witnesses:
A. Zicktl
H. Nudfeldt
Inventor:
Henry Norton Butter Good
by
Wm H Babcock
Attorney (No Model.) 2 Sheets—Sheet 2.
H. N. B. GOOD.
PHOTOGRAPHIC CAMERA.
No. 421,923. Patented Feb. 25, 1890.
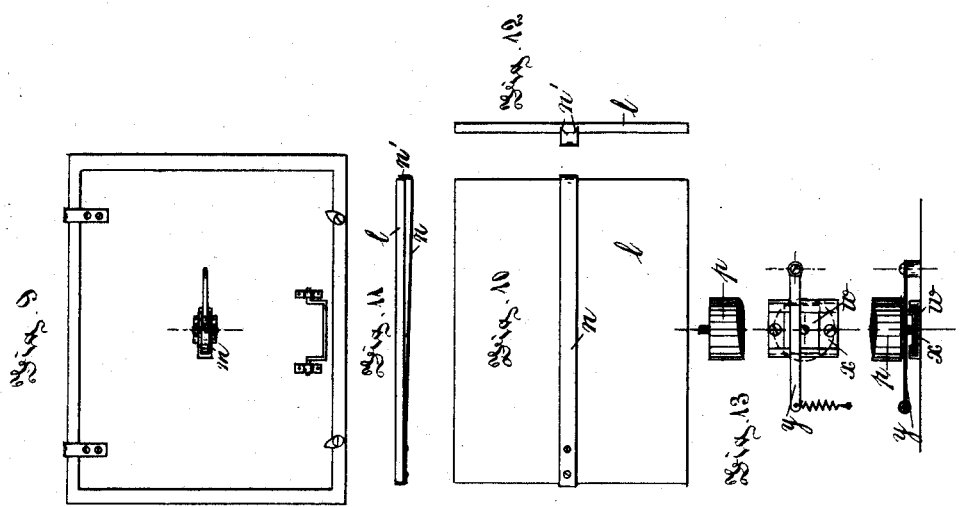
Witnesses:
A. Ziehtl
H. Nredfeldt
Inventor:
Henry Norton Butler Good
by
Wm H Babcock
Attorney

UNITED STATES PATENT OFFICE.

HENRY NORTON BUTLER GOOD, OF DEVIZES, COUNTY OF WILTS, ENGLAND.

PHOTOGRAPHIC CAMERA.

SPECIFICATION forming part of Letters Patent No. 421,923, dated February 25, 1890.

Application filed May 25, 1889. Serial No. 312,152. (No model.)

*To all whom it may concern:*

Be it known that I, HENRY NORTON BUTLER GOOD, gentleman, a subject of the Queen of Great Britain, residing at Devizes, in the county of Wilts, England, have invented certain new and useful Improvements in Photographic Cameras; and I do hereby declare the following to be a full, clear, and exact description of the invention.

This invention relates to photographic cameras in which pictures are taken upon a film or strip of sensitized material carried upon rollers for supplying and taking up the film, the rollers acting in combination with indicating apparatus and allowing the film to be supplied in proper quantities for a series of exposures after the lens has been uncovered by a spring-shutter.

The invention consists in certain constructions and combinations of parts in such cameras, including the arrangement of the rollers, so that space is greatly economized.

The invention also consists in certain other improvements in the construction and combination of the various parts of the camera, as herein particularly set forth and shown.

Reference is to be had to the accompanying drawings, in which—

Figure 1 is a perspective view, Fig. 2 a horizontal section, and Fig. 3 a longitudinal vertical section, of the improved camera. Figs. 4, 5, 6, 7, and 8 are separate views showing the receiving-roller and its connections. Fig. 9 is a view of the back of the camera and the cam, and Figs. 10, 11, and 12 are views of the ebonite plate and marking-spring. Fig. 13 is a separate view of the registering-roller and its attachments.

The improved camera consists of a box or case $a$, of suitable size, preferably rectangular, and of wood or other material. In front of this box is an opening $b$, provided with an instantaneous or other shutter (not shown in the drawings) of any of the ordinary well-known kinds, by which the spring can be opened and closed for the purpose of obtaining a picture. Behind the shutter I arrange in the box a transverse partition $c$, carrying a lens of the required size and focus, and at the back of the partition $c$, I arrange two lateral vertical partitions $d\ d'$, the front edges of which join the front partition $c$ at each side of the lens, while their back edges separate until they nearly reach the sides of the box at a short distance from the back. In the angular spaces thus formed behind the front partition $c$, I arrange the holding roller or spool $e$ and the receiving-roller $e'$, respectively, the former having the sensitized strip or film $i$ wound upon it, the end of the strip being led from it backward, then across the space between the back ends of the lateral partitions $d\ d'$, and again forward to the receiving-roller $e'$, to which it is fastened, so that when the latter is turned round the strip is wound upon it and at the same time unwound from the full roller or spool $e$. At or near the back edges of the lateral partitions $d\ d'$, I arrange vertical rollers or guides $h\ h'$, preferably of glass or wood or other material covered with glass, round which the film $i$ passes and is guided with very little friction or risk of abrasion.

Upon the interior surface of the top and bottom of the box or camera $a$, just in front of the sensitized strip or film $i$ as it passes across the back, I arrange two transverse strips $k\ k'$, Figs. 2 and 3, of wood or other material, behind the edges of which the edges of the strip $i$ pass, and against which they are pressed with sufficient force by a flat plate $l$, of ebonite or other suitable material, which is pressed against the back of the strip by a cam $m$, passing through the hinged back of the box, as shown in Figs. 2, 3, and 9. At the back of the ebonite plate $l$ a transverse metal spring $n$ is arranged, one end of which is fixed to one edge of the plate $l$, while its other end at $n'$ is sufficiently long to be bent forward and project slightly in front of the plate $l$, its ends being provided with one or more points, Figs. 10, 11, and 12.

When the film or strip $i$ has been adjusted in the proper position to receive a picture from the lens, the ebonite plate $l$ is pressed forward by the cam $m$, so as to hold the edges of the film firmly in position against the top and bottom strips $k\ k'$, the screw or cam $m$ first pressing forward the spring $n$, the pointed end of which at $n'$ marks the paper $i$ from the back sufficiently to indicate the position of the picture upon it when it is ultimately removed from the rollers for the purpose of being cut up and developed in the usual way. Small springs $o$ are arranged to press back the ebonite plate $l$ from contact with the back of the film $i$ when the pressure of the screw or cam $m$ is withdrawn.

In one of the angular spaces first described, between the front partition $c$ and the lateral vertical partitions $d$ $d'$, I arrange a vertical roller $p$, against which the film or strip $i$ presses, and which is made to revolve by such pressure when the rollers $e$ $e'$ are made to revolve and draw the strip $i$ forward. The axle of this roller $p$ may be provided with a toothed pinion actuating an indicating device $r$ on the outside of the camera, by which it can be seen when the film has moved exactly sufficiently forward to present the proper surface for a new picture, and also, if desired, to show the number of exposures which have been made and of pictures taken.

The rollers $e$ $e'$, which carry the sensitized strip or film $i$, are made readily removable, so that they can be taken out and replaced as desired, each roller having its bearing at one end on the pointed tip of a screw $s$ in the bottom of the camera, which can be screwed up or unscrewed as desired.

The receiving-roller $e'$ is fitted at one end to a socket $t$, Figs. 6 and 7, the outer end of which can be turned round by a suitable key or handle for the purpose of turning the roller, and so causing the strip or film $i$ to pass behind the lens, as already described. I prefer to make the key removable and with a solid end square or of other suitable form, which fits into a corresponding hole in the end of the socket $t$, which turns the receiving-roller $e'$; and the same key may also fit into the similar recess which carries the other centers $s$ for the rollers, and in this way no projecting part is necessary outside the box or camera.

Either or both the rollers $e$ $e'$ may be provided with ratchet-wheels and pawls, or their equivalents, by which the rollers are prevented from turning in the wrong direction, and springs or other brakes (such as shown at $v$, Figs. 1 and 2) may be arranged so as to press upon the strip upon the rollers or upon brake-wheels upon the roller-sockets, and so keep the rollers from too easily unwinding, and thus allowing the strip to be imperfectly stretched.

The axle of the registering-roller $p$ may be carried in movable bearings at one or both ends, as shown in Fig. 13, the bearing $w$, in which the axle revolves, being capable of moving backward and forward in a guide $x$, and then being constantly pressed inward by a lever and spring $y$. In this way the film $i$ is kept constantly stretched by the elastic pressure of the roller $p$ against it. Similar movable bearings may also be used for the other rollers, if desired.

By the improved methods of construction and arrangement which constitute my invention great economy of space is effected, the rollers for holding the strip or film being placed so as to occupy the smallest possible space in the angles between the partition $c$ and those $d$ and $d'$. The flexible strip or film is wound upon the rollers, so that as it passes in front of the ebonite plate it has no tendency to curve or buckle outward, but rather to remain flat in contact with the plate, and so to insure perfect pictures. Great advantage is thus obtained, since when the strip or film is wound and used in the way described its surface is flatter, even if the ebonite plate be altogether removed, than when wound in the manner ordinarily hitherto used. Stops or diaphragms may be introduced through an opening at A, Fig. 1. The rollers $e$ $e'$ can be very easily detached from their sockets and others substituted for them, so that it is not necessary to unwind the strip from the receiving-roller. The ends of the strip or film are attached to the rollers $e$ $e'$ in the manner shown in Figs. 2 and 4. A wedge-shaped groove is made from end to end of the roller, into which the end of the film is inserted, and a separate wedge P, formed of a strip of flexible metal bent to a corresponding angle, is pressed into the groove upon the film, which is thereby firmly held. The wedge can be readily withdrawn to remove the film and attach a fresh one.

In Figs. 14, 15, 16, and 17, $c$ is the partition in the camera to which the lens E is fixed. F is a disk of ebonite or other light material, having a central spindle provided with a toothed pinion K and turning in a bearing in the frame of a spring clock-work I, which can be wound up from outside by a key at L and causes the disk F to revolve in front of the lens E, an opening H in the disk passing in front of the lens and exposing the latter to light instantaneously. N is a projection at the edge of the disk, which engages with the spring-catch M, so that the disk is held from revolving. O is an external knob or button connected with the spring-catch M, upon pressing which the projection N is released, and the disk makes a single revolution, when N is again caught by the opposite side of the catch. In this way instantaneous exposures may be made as long as the clockwork is wound up.

The trouble and the risk of damaging the sensitive surface of the paper (by being obliged to unwind all the exposed part off the receiving-roller when the holding-roller or spool is empty) are avoided by providing the inexpensive rollers and metal clips of the same size as the spools upon which the paper is supplied by the makers. These rollers are capable of being detached from the sockets that hold their ends as easily as spools, and the sockets of each (receiving-roller and spool) may be of the same shape, so that the ordinary old spools, with the addition of a small piece of metal secured to their ends with small screws, may be used as receiving-rollers.

The entire camera may be covered with leather, paper, or other material, so as not to be too conspicuous or readily noticeable, and its sides are closed, preferably, by plates of ebonite, wood, or other suitable material sliding in grooves and fitting so closely as to prevent the admission of light.

I claim—

1. In photographic cameras in which pictures are taken upon a film or strip of sensitized material, the combination, in the camera, of the exterior casing, the partition $c$, and inclined partitions $d\ d'$, forming angular spaces containing the holding and receiving rollers $e\ e'$, said partition $c$ being in proximity to the lens, and said spaces being between the said angular partition and the said outer casing, substantially as described and shown.

2. The combination of the camera $a$, partition $c$ and lens, inclined partitions $d\ d'$, forming recesses containing the holding and receiving rollers $e\ e'$, the guide rollers or cylinders $h\ h'$, and guiding-strips $k\ k'$, substantially as described and shown.

3. The movable plate $l$, in combination with the camera back and cam $m$ or equivalent device, substantially as and for the purpose described and shown.

4. In combination with the movable plate $l$ and camera back and cam $m$ or equivalent device, the spring $n$ at the back of the plate $l$, having one or more marking-points $n'$, arranged and operating substantially as and for the purpose described and shown.

5. In combination with the roller $p$ and indicating device, the movable bearings $w$ for the roller $p$, working in guides $x$ and pressed inward by lever and spring $y$, substantially as described and shown.

In testimony that I claim the foregoing I have hereunto set my hand this 13th day of February, 1889.

HENRY NORTON BUTLER GOOD.

Witnesses:
　ARTHUR E. EDWARDS,
　E. SCRIVEN.